J. H. WEAVER.
COUNTER SPRING FOR VEHICLES.
APPLICATION FILED AUG. 6, 1917

1,281,445.

Patented Oct. 15, 1918.

J. H. Weaver,
Inventor.

By Albert Parker
Attorney.

UNITED STATES PATENT OFFICE.

JOHN HENRY WEAVER, OF AUCKLAND, NEW ZEALAND.

COUNTER-SPRING FOR VEHICLES.

1,281,445.  Specification of Letters Patent.  Patented Oct. 15, 1918.

Application filed August 6, 1917. Serial No. 184,773.

*To all whom it may concern:*

Be it known that I, JOHN HENRY WEAVER, a citizen of the dominion of New Zealand, and residing at 12 Park avenue, Auckland, in the Provincial District of Auckland, in the Dominion of New Zealand, have invented certain new and useful Improvements in Counter-Springs for Vehicles, of which the following is a specification.

This invention relates to springs for vehicles and provides a spring for preventing undue reflex action of the ordinary axle springs.

The invention consists in providing a spring with its leaves arranged so that the resiliency shall decrease with the expanding of the spring. The action is, therefore, the reverse of the action of the axle spring.

A double elliptic spring made according to my invention has the ends of its exterior leaves connected together by pins, and graduated leaves are fixed to each exterior leaf, and between the said exterior leaves.

The reflex action of the ordinary axle springs is checked by my spring, so that undue motion, which usually occurs in motor cars, is counteracted or avoided.

The position of the counter spring is governed by the construction of the vehicle to which it is applied and the said counter spring may be arranged side by side with each axle spring, or fixed to the middle part of the axle or elsewhere.

The drawing herewith illustrates the invention and will now be referred to for the purposes of a detailed description:—

Figure 1, is a side elevation, and

Fig. 2 a plan of the spring,

Figure 1:
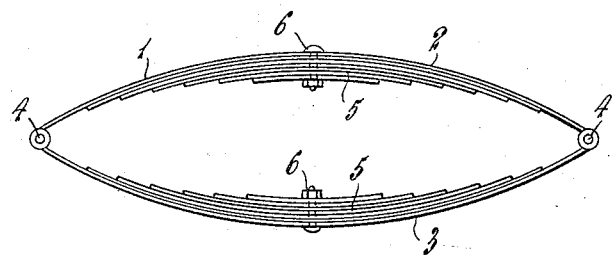
Figure 2:
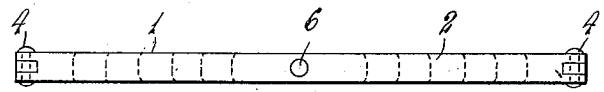

The counter spring 1 has exterior elliptical leaves 2 and 3 united at their ends by pins 4 in a well known manner.

The graduated leaves 5 are attached to the leaves 2 and 3 by bolts or rivets 6, and the said leaves 5 are located between the exterior leaves 2 and 3.

Figure 3:
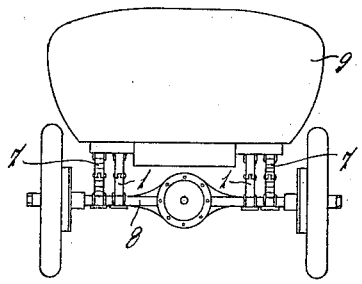
Fig. 3, is a rear end elevation of a vehicle embodying the invention.

The ordinary vehicle springs in Fig. 3 are fixed as usual near the ends of the axle 8, and the counter springs 1 are fixed to the said axle and to the body 9 of the vehicle alongside and near the springs 1.

Figure 4:
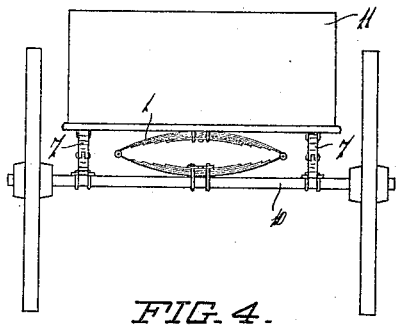
Fig. 4, is a rear end elevation of a vehicle showing another embodiment of the invention.

In Fig. 4, the ordinary vehicle springs 7 are also fixed near the ends of the axle 10, and the counter spring 1 is fixed to the central part of the said axle 10, and to the vehicle 11.

The ordinary springs 7 take the weight of the vehicle and absorb shocks as usual, while the counter springs 1 prevent undue recoil of the springs 7 by their resiliency decreasing as they expand owing to the rising of the body 9 from its axle.

The counter springs 1 are attached to all the axles of a vehicle, although the drawings illustrate the same applied to a rear axle only or the single axle of a vehicle.

What I do claim and desire to secure by Letters Patent of the United States is:—

1. The combination with a vehicle body and axle having elliptical load carrying springs located between them, of an elliptical spring located between the body and axle and having graduated leaves fixed to the opposite sides of the spring and located between the sides for cushioning the rebound of the load carrying springs.

2. The combination with a vehicle body and axle, of elliptical load carrying springs located between the body and axle and having graduated leaves fixed to the opposite sides of the springs and located on the outer sides of said springs, and elliptical springs of approximately the same size as the other springs located between the axle and body and having graduated leaves of approximately the same size as the leaves of the other springs, fixed to the inner sides of said springs for cushioning the rebound of the load carrying springs.

In testimony whereof I affix my signature in presence of two witnesses.

JOHN HENRY WEAVER.

Witnesses:
L. F. McCONNELL,
F. G. SCOTT SMITH.

Copies of this patent may be obtained for five cents each, by addressing the "Commissioner of Patents, Washington, D. C."